(12) United States Patent
Huang et al.

(10) Patent No.: US 8,365,874 B2
(45) Date of Patent: Feb. 5, 2013

(54) ELECTRIC PARKING BRAKE ACTUATOR

(75) Inventors: Chien-Tai Huang, Huatan Hsiang (TW); Chien-Tzu Chen, Taichung (TW); Shou-Ti Cheng, Changhua (TW)

(73) Assignee: Automotive Research & Testing Center, Changhua Hsien (TW)

( * ) Notice: Subject to any disclaimer, the term of this patent is extended or adjusted under 35 U.S.C. 154(b) by 283 days.

(21) Appl. No.: 12/819,835

(22) Filed: Jun. 21, 2010

(65) Prior Publication Data
US 2011/0308902 A1 Dec. 22, 2011

(51) Int. Cl.
*B60L 7/00* (2006.01)
*G01L 1/00* (2006.01)

(52) U.S. Cl. ... 188/2 D; 188/156; 74/500.5; 74/501.5 R; 74/502; 74/502.4; 74/502.6; 73/779; 73/862.193

(58) Field of Classification Search ............ 188/2 D, 188/156; 324/207.11, 207.13, 207.2, 207.21, 324/207.22, 207.24–207.26; 74/500.5, 501.5 R, 74/502, 502.4, 502.6; 73/779, 862.193
See application file for complete search history.

(56) References Cited

U.S. PATENT DOCUMENTS

| | | | | |
|---|---|---|---|---|
| 4,719,362 A | * | 1/1988 | Nest et al. ............... | 307/116 |
| 6,218,623 B1 | * | 4/2001 | Miyakawa et al. ....... | 174/120 R |
| 6,386,338 B1 | * | 5/2002 | Powrozek ................ | 188/156 |
| 7,458,649 B2 | * | 12/2008 | Jeon ........................ | 303/89 |
| 7,461,724 B2 | * | 12/2008 | Nago ...................... | 188/24.22 |
| 7,971,488 B2 | * | 7/2011 | Sturze .................... | 73/760 |
| 2002/0145422 A1 | * | 10/2002 | Chamings et al. ....... | 324/207.26 |
| 2007/0188161 A1 | * | 8/2007 | Asa ......................... | 324/207.11 |
| 2009/0128140 A1 | * | 5/2009 | Nishikawa et al. ....... | 324/207.22 |

FOREIGN PATENT DOCUMENTS
WO   WO 2007107404 A1 * 9/2007

* cited by examiner

*Primary Examiner* — Robert A Sicondolfi
*Assistant Examiner* — Anna Momper
(74) *Attorney, Agent, or Firm* — C. G. Mersereau; Nikolai & Mersereau, P.A.

(57) ABSTRACT

An electric parking brake actuator has an actuator device, a brake device and a cable-tension measuring device. The brake device has a cable and a tube assembly. The cable is mounted through the actuator device. The tube assembly is mounted around the cable and has a first tube, a second tube, a spring, a Hall IC and a magnet. The cable-tension measuring device has a first member and a second member which are mounted around the cable. The second member is capable of moving toward the first member relatively. The compressible spring is mounted between and abuts the first member and the second member. The Hall IC and the magnet are respectively mounted securely on the first member and the second member. The Hall IC is capable of measuring how much the spring is compressed to further measure the tension of the cable.

5 Claims, 7 Drawing Sheets

ELECTRIC PARKING BRAKE ACTUATOR

BACKGROUND OF THE INVENTION

1. Field of the Invention

The present invention relates to an electric parking brake actuator, and more particularly to an electric parking brake actuator which is capable of measuring a tension of a cable.

2. Description of Related Art

In a conventional electric parking brake actuator having a cable-tension measuring device, a cable is cut into two segments and connected with a spring in series way. The compression of the spring can determine and calculate a tension of the cable. However, an extra balancer has to be mounted to balance the cut cable and this is inconvenient.

The tension of the cable is also measured by a feedback current of a motor. The big feedback current represents the big tension of the cable. However, the feedback current is easily interfered by other signal to cause an error of measurement.

To overcome the shortcomings, the present invention tends to provide an electric parking brake actuator to obviate the aforementioned problems.

SUMMARY OF THE INVENTION

The main objective of the invention is to provide an electric parking brake actuator which is capable of measuring a tension of a cable.

An electric parking brake actuator has an actuator device, a brake device and a cable-tension measuring device. The brake device has a cable and a tube assembly. The cable is mounted through the actuator device. The tube assembly is mounted around the cable and has a first tube, a second tube, a spring, a Hall IC and a magnet. The cable-tension measuring device has a first member and a second member which are mounted around the cable. The second member is capable of moving toward the first member relatively. The compressible spring is mounted between and abuts the first member and the second member. The Hall IC and the magnet are respectively mounted securely on the first member and the second member. The Hall IC is capable of measuring how much the spring is compressed to further measure the tension of the cable.

Other objects, advantages and novel features of the invention will become more apparent from the following detailed description when taken in conjunction with the accompanying drawings.

DETAILED DESCRIPTION OF PREFERRED EMBODIMENT

Figure 1:
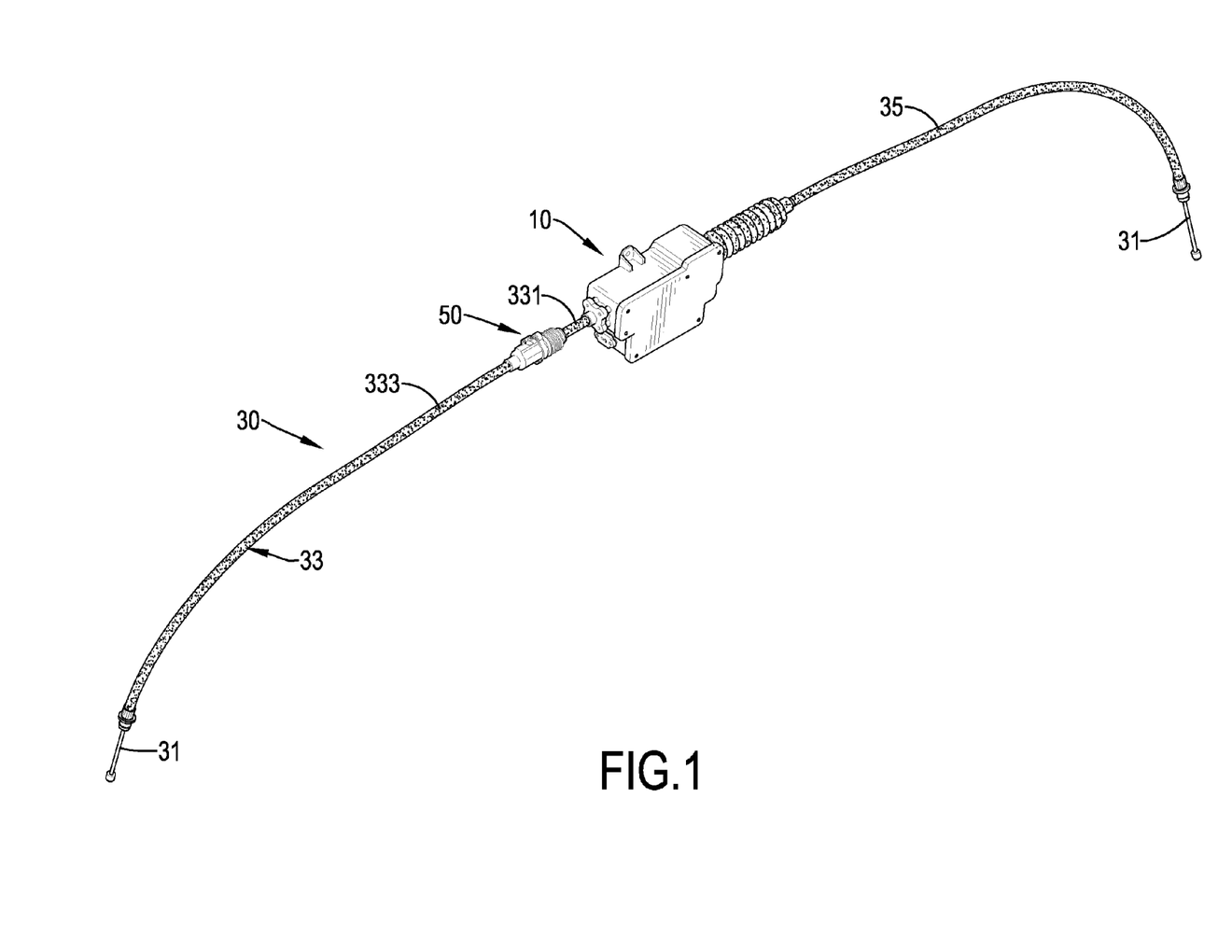
FIG. 1 is a perspective view of a first embodiment of an electric parking brake actuator in accordance with the present invention.
Figure 2:
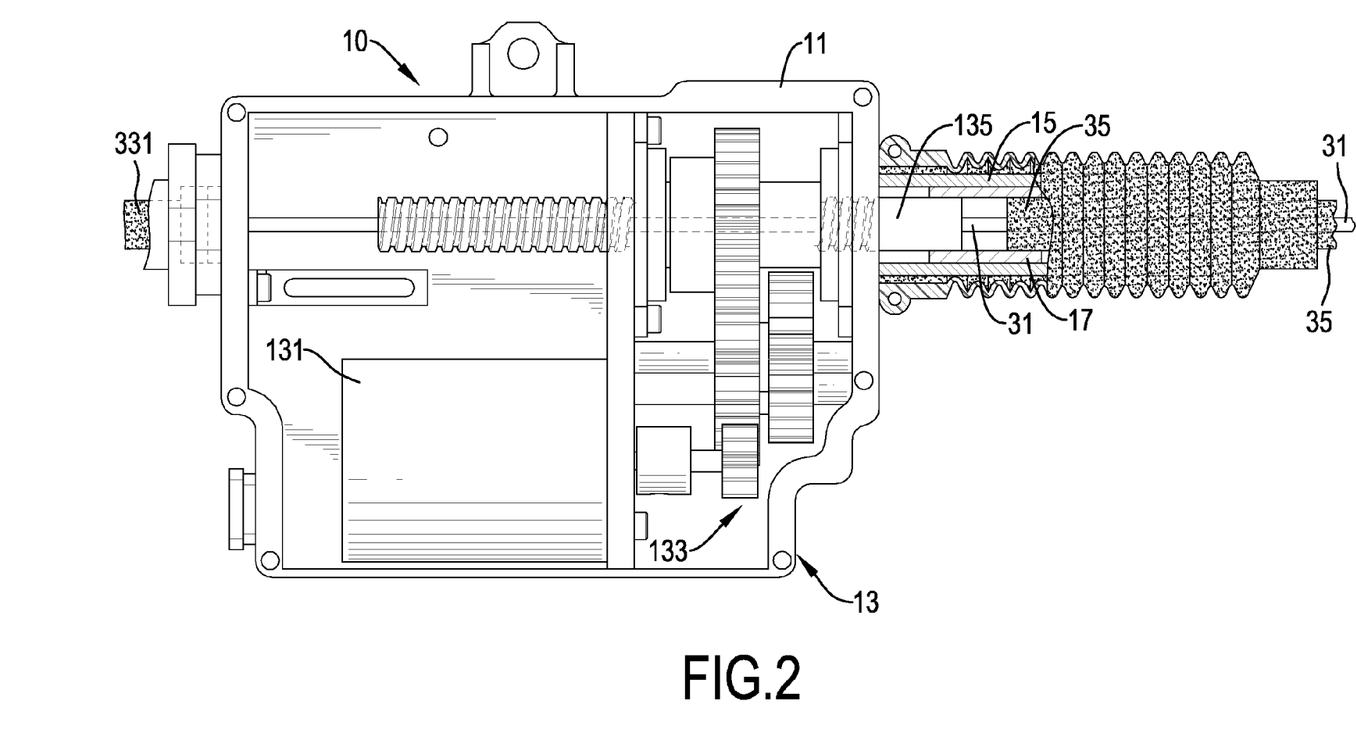
FIG. 2 is an enlarged side view in partial section of the electric parking brake actuator in FIG. 1, wherein an actuator device is shown.
Figure 3:
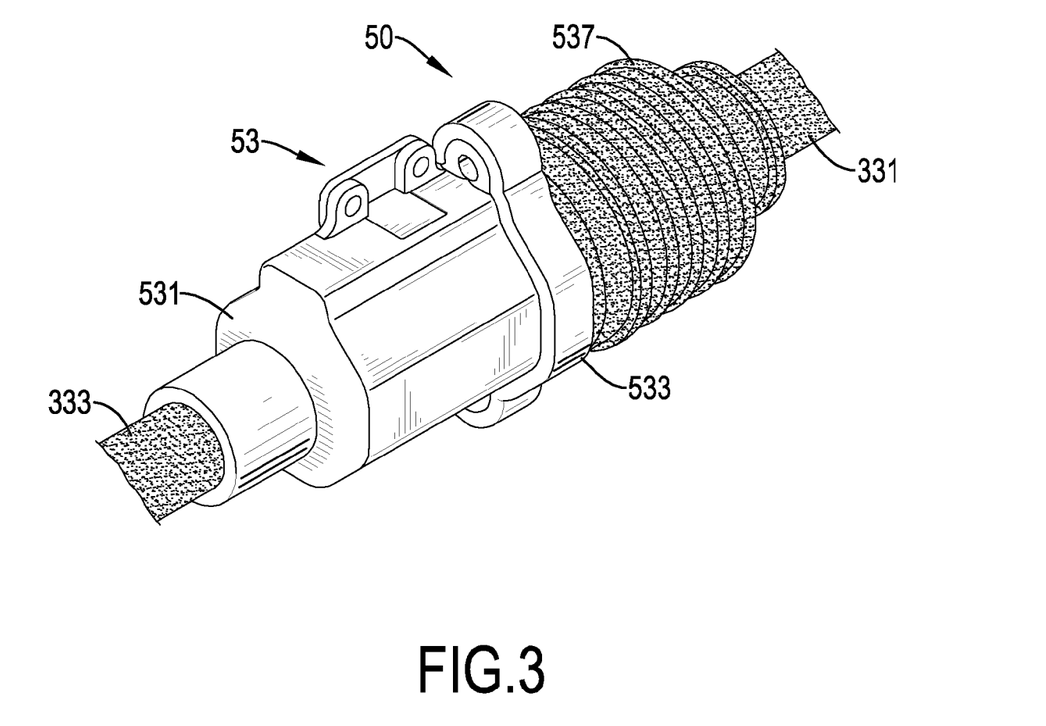
FIG. 3 is an enlarged perspective view of the electric parking brake actuator in FIG. 1, wherein a cable-tension measuring device is shown.

With reference to FIGS. 1 to 3, a first embodiment of an electric parking brake actuator in accordance with the present invention comprises an actuator device 10, a brake device 30 and a cable-tension measuring device 50.

The actuator device 10 has a housing 11, an actuator assembly 13, a guiding tube 15 and a sleeve 17. The actuator assembly 13 is mounted in the housing 11 and has a motor 131, a reduction gear unit 133 and a lead screw 135. The reduction gear unit 133 is connected with the motor 131 and the lead screw 135 to make the motor 131 drive the lead screw 135 to move horizontally with the transmission of the reduction gear unit 133. The lead screw 135 has a driving end. The guiding tube 15 is mounted securely on and protrudes out from the housing 11. The sleeve 17 is securely mounted around the driving end, is driven by the lead screw 135 and is slidably mounted in the guiding tube 15. The actuator device 10 may be conventional and detailed description is omitted.

The brake device 30 is connected with the actuator device 10 and has a cable 31 and a tube assembly. The tube assembly has a first tube 35 and a second tube 33. The cable 31 is mounted through the second tube 33, the housing 11, the lead screw 135, the sleeve 17 and the first tube 35.

The first tube 35 has two ends. One of the ends of the first tube 35 is inserted securely into the sleeve 17. Accordingly, the lead screw 35 can drive the first tube 35 to move with the sleeve 17. The other of the ends of the first tube 35 is mounted securely on an arranged position near a tire, not shown in the drawings. When the sleeve 17 slides horizontally, the first tube 35 moves outwardly relative to the housing 11 to elongate a length of an exterior part of the first tube 35 which is exposed outside the guiding tube 15. Accordingly, the first tube 35 applies a force to the cable 31 to make the cable 31 tightened and curved. Consequently, this can brake a car.

The second tube 33 has two ends. One of the ends of the second tube 33 is mounted securely on the housing 11. The other of the ends of the second tube 33 is mounted securely on an arranged position near a tire, not shown in the drawings. Preferably, the second tube 33 is composed of two separate segments including a first segment 331 and a second segment 333.

Figure 4:
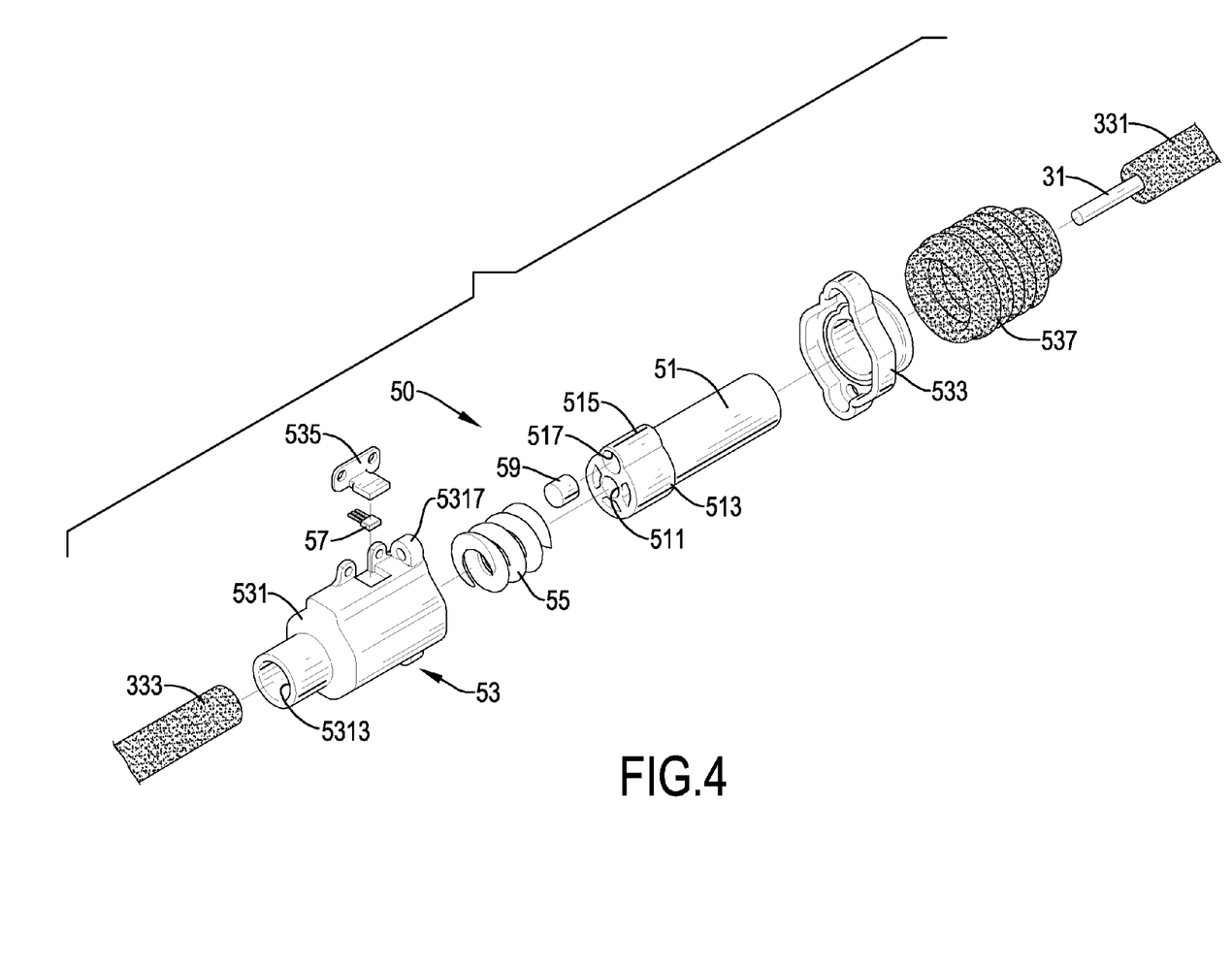
FIG. 4 is an enlarged and partially exploded view of the cable-tension measuring device of the electric parking brake actuator in FIG. 3.
Figure 5:
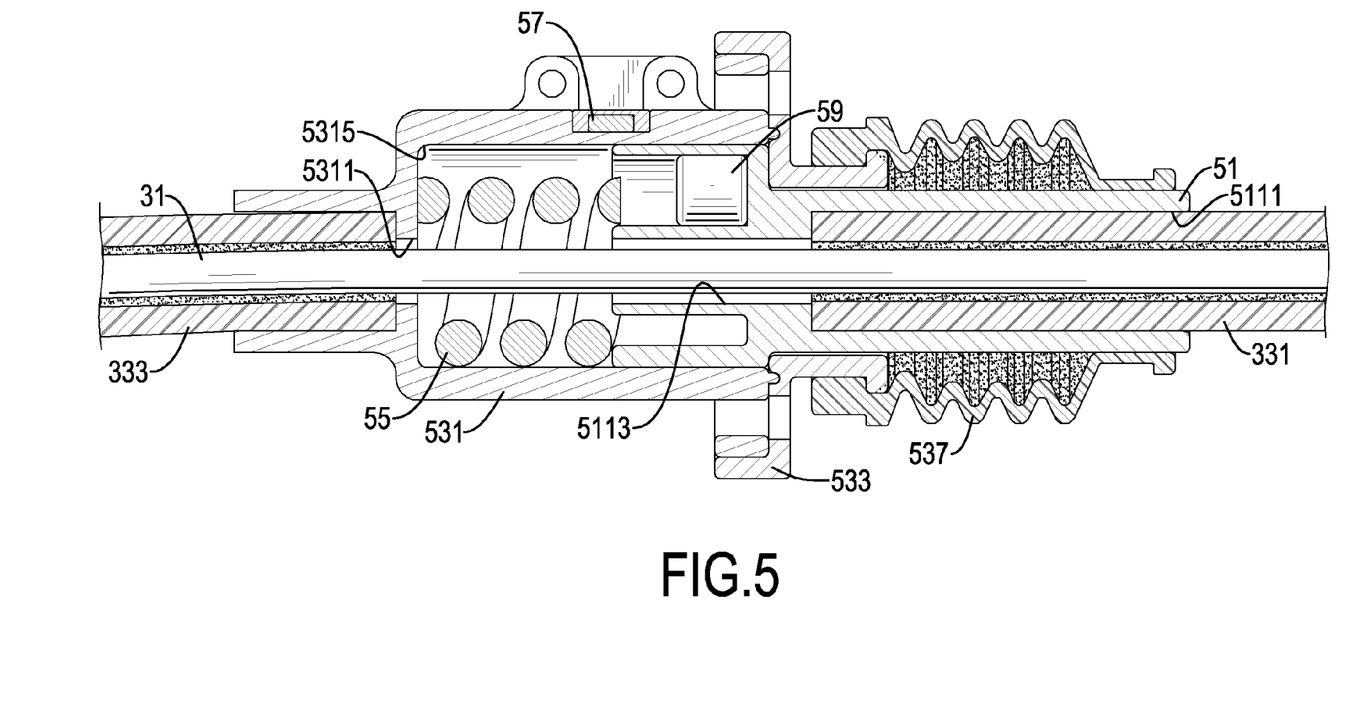
FIG. 5 is an enlarged side view in partial section of the cable-tension measuring device of the electric parking brake actuator in FIG. 3.

With reference to FIGS. 3 to 5, the cable-tension measuring device 50 is connected with the second tube 33 and has a first member 51, a second member 53, a spring 55, a Hall IC 57 and a magnet 59. The second member 53 is capable of moving relative to the first member 51. The first member 51 and the second member 53 are slidably mounted around the cable 31. The spring 55 is mounted between the first member 51 and the second member 53, abuts the first member 51 and the second member 53 and is compressible. The Hall IC 57 and the magnet 59 are respectively mounted securely on the first member 51 and the second member 53. The Hall IC 57 (Hall Integrated Circuit) is a Hall effect sensor and a transducer that varies the transducer's output voltage in response to changes in magnetic field. With the output voltage in proportion to the change in magnetic field, the Hall IC 57 is used to determine a distance between two objects. The Hall IC 57 may be conventional and detailed description is omitted.

Preferably, the first segment 331 has two ends respectively mounted securely on the housing 11 and the first member 51. The second segment 333 has two ends. One of the ends of the second segment 333 is mounted securely on the second member 53. The other of the ends of the second segment 333 is fixed at the arranged position.

Preferably, the first member 51 is tubular and has an end surface, an outer surface, a through hole 511 and a rim 513. The end surface of the first member 51 faces the second member 53. The through hole 511 is axially formed through the first member 51 and has a wide section 5111 and a narrow section 5113. The wide section 5111 has a diameter. The narrow section 5113 is adjacent to the spring 55 and has a diameter smaller than that of the wide section 5111. The rim 513 is round, radially protrudes from the outer surface of the first member 51 and aligns with the end surface of the first member 51. A corresponding end of the first segment 331 is inserted securely into the wide section 5111.

The second member 53 has a tube bracket 531 and a hoop 533. The tube bracket 531 is tubular and has two ends, a bracket hole 5311, a tube recess 5313 and a spring recess 5315. The tube recess 5313 and the spring recess 5315 are respectively and axially formed in the ends of the tube bracket 531. The tube recess 5313 and the spring recess 5315 respectively have a bottom. The bracket hole 5311 is axially formed through the bottoms of the tube recess 5313 and the spring recess 5315 and has a diameter. The tube recess 5313 and the spring recess 5315 respectively have a diameter larger than that of the bracket hole 5311. The tube recess 5313 is mounted securely around a corresponding end of the second segment 333. The spring recess 5315 is mounted around the rim 513 and has an opening. The hoop 533 is hollow and is mounted around the first member 51 beside the rim 513 and the end of the tube bracket 531 which is adjacent to the spring recess 5315. The hoop 533 has an end adjacent to the first member 51. The hoop 533 is used to connect the first member 51 with the tube bracket 531. Because the hoop 533 blocks the opening of the spring recess 5315 which allows the rim 513 to escape, the hoop 533 is capable of restricting a moving path of the rim 513 and prevents the first member 51 from escaping out of the spring recess 5315. The spring 55 is mounted in the spring recess 5315 and has two ends. The ends of the spring 55 respectively abut the bottom of the spring recess 5315 and the end surface of the first member 51.

Preferably, the first member 51 has a holding section 515 and a magnet recess 517. The holding section 515 is elongated along a line parallel to an axis of the first member 51, has an arcuated cross section and radially protrudes from the rim 513. The magnet recess 517 is formed in the holding section 515 and has an opening facing the spring 55. The tube bracket 531 has an outer surface. The second member 53 further has an IC seat 535 mounted securely on the outer surface of the tube bracket 531. The magnet 59 is mounted securely in the magnet recess 517. The Hall IC 57 is mounted securely on the IC seat 535.

Because the holding section 515 makes a cross section of the end surface of the first member 51 in the spring recess 5315 become non-round, this prevents the first member 51 from rotating relative to the tube bracket 531 and allows the magnet 59 to move linearly relative to the Hall IC 57. Accordingly, inaccurate tension value is avoided.

Preferably, the second member 53 further has a pleated tube 537 mounted around the first member 51 and the end of the hoop 533.

Preferably, the tube bracket 531 has two opposite sides and two protrusions 5317. The protrusions 5317 are formed on the outer surface of the tube bracket 531 beside the IC seat 535, are respectively located at the opposite sides of the tube bracket 531 and are covered by the hoop 533. The protrusions 5317 are used to prevent the hoop 533 from rotating relative to the tube bracket 531.

Figure 6:
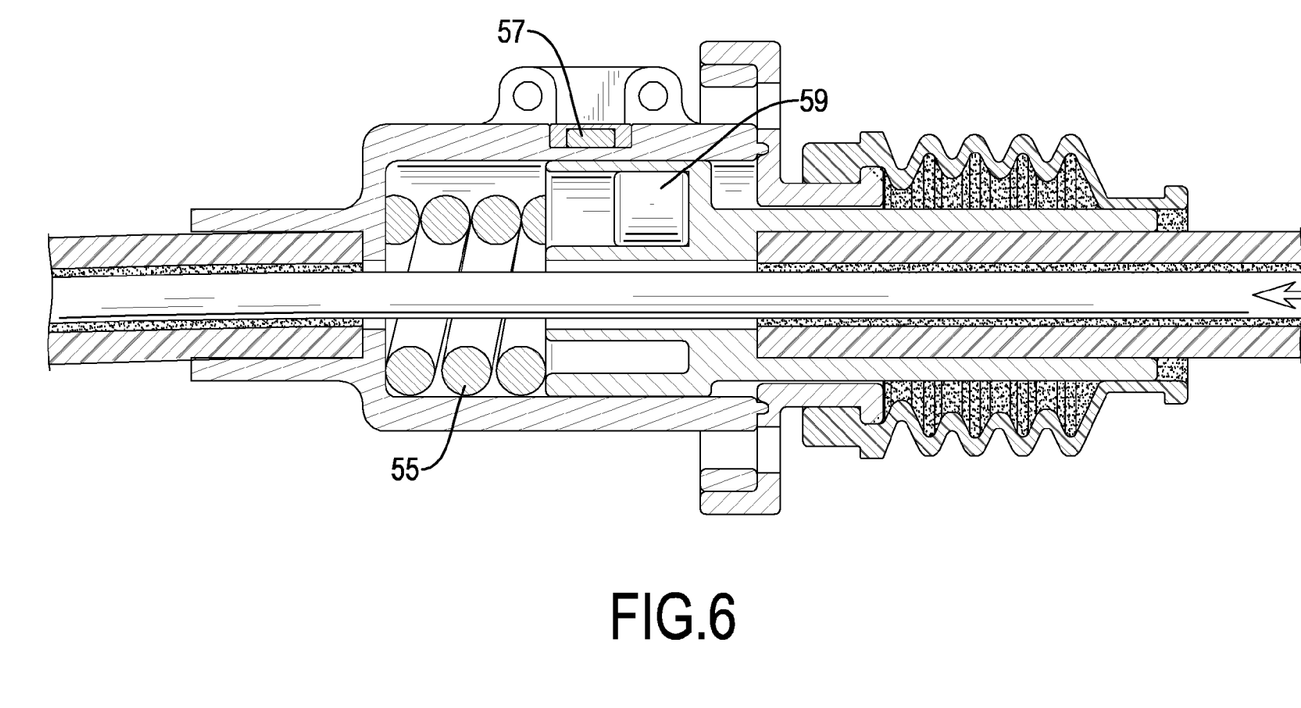
FIG. 6 is an operational view in partial section of the cable-tension measuring device of the electric parking brake actuator in FIG. 5.

With reference to FIGS. 4 to 6, when the first embodiment of the electric parking brake actuator in accordance with the present invention is in use, the lead screw 135 firstly drives the sleeve 17 to slide outwardly relative to the housing 11. The sleeve 17 also drives the first tube 35 to move outwardly, shown as a right side in the FIG. 2.

Second, the length of the exterior part of the first tube 35 which is exposed outside the guiding tube 15 is elongated to tighten the cable 31 for braking. The second tube 33 is also applied to a tension generated by the tightened and curved cable 31 and generates a tension. Accordingly, the spring 55 is compressed and the magnet 59 moves toward the Hall IC 57 relatively. Because a distance between the magnet 59 and the Hall IC 57 is changed by the tension of the second tube 33 and represents the compression of the spring 55, the Hall IC 57 is capable of measuring the distance to further calculate the tension of the second tube 33. The tension of the second tube 33 is in proportion to the tension of the cable 31, so the tension of the cable 31 is measured and calculated.

In the present invention, the Hall IC 57 can be also mounted securely on the first member 51 and the magnet 59 can be mounted securely on the second member 59. As long as the magnet 59 is capable of moving toward the Hall IC 57 relatively, the present invention does not limit the positions of the magnet 59 and the Hall IC 57.

The cable-tension measuring device 50 can also be mounted securely on the first tube 35 composed of two separate segments to measure and calculate the tension of the cable 31

In an alternative embodiment, the second tube 33 is a single tube and has two ends. The cable-tension measuring device 50 is mounted securely on any one of the ends of the second tube 33. Accordingly, the cable-tension measuring device 50 is mounted in the housing 11 or located at the arranged position where the end of the second tube 33 is securely mounted. The present invention does not limit the position of the cable-tension measuring device 50 and the format of the second tube 33.

Figure 7:
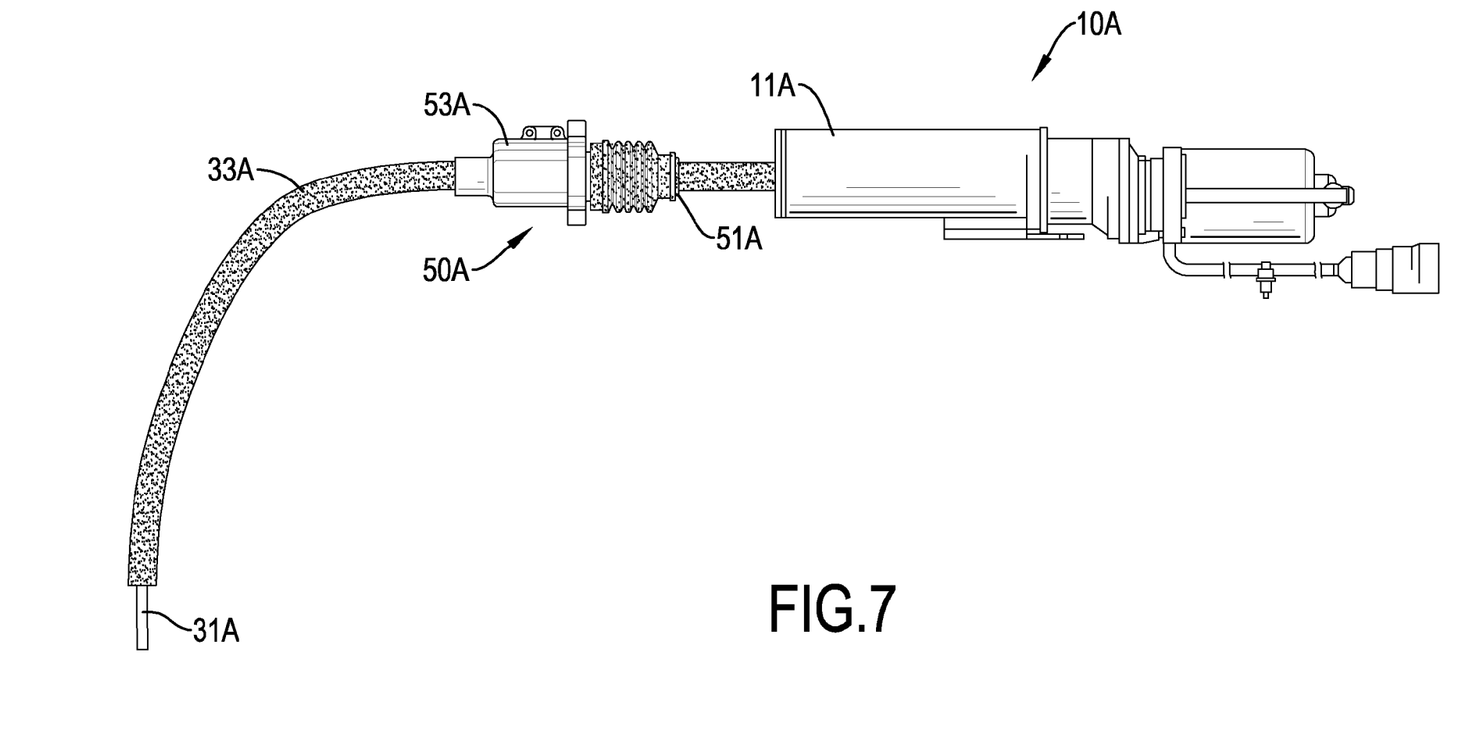
FIG. 7 is a side view of a second embodiment of an electric parking brake actuator in accordance with the present invention.

With further reference to FIG. 7, a second embodiment of the electric parking brake actuator in accordance with the present invention comprises an actuator device 10A, a brake device 30 and a cable-tension measuring device 50A. The actuator device 10A has a housing 11A and an actuator assembly which is mounted in the housing 11A. The brake device 30 has a cable 31A and a second tube 33A. The cable 31A is connected with the actuator assembly. The cable-tension measuring device 50A is connected with the second tube 33A and has a first member 51A and a second member 53A. The actuator device 10A of the second embodiment may be conventional and detailed description is omitted. The cable 31A is capable of being tightened by the actuator assembly. When the cable 31A is tightened, the second tube 33A is curved and the first member 51A moves toward the second member 53A relatively. Similarly, the tension of the cable 31A is also measured and calculated. Accordingly, to cut the cable 31A into two segments is unnecessarily and a conventional balancer is also unnecessary.

From the above description, it is noted that the present invention has the following advantages:

1. Simple Structure:

Because the tension of the second tube 33,33A is measured to calculate the tension of the cable 31,31A, the cable 31,31A does not have to be cut and the structure of the actuator assembly 13 does not have to be changed. Only the first tube 35 or the second tube 33,33A needs to be replaced. To assemble the cable-tension measuring device 50,50A on the actuator device 10,10A is very convenient.

2. Excellent Versatility for Different Electric Brake Actuator:

The cable-tension measuring device 50,50A is assembled easily and conveniently on the first tube 35 or the second tube 33,33A, so the cable-tension measuring device 50,50A is easily applied to different kinds of conventional electric brake actuators.

3. Excellent Versatility of Different Location of the Cable-Tension Measuring device 50,50A:

If the cable-tension measuring device 50,50A is closer to the arranged position where the end of the second tube 33,33A is securely mounted, the measuring value of the tension of the cable 31,31A is more precise. Alternatively, the cable-tension measuring device 50,50A can be also mounted in the housing 11,11A. It is very versatile for the cable-tension measuring device 50,50A to be connected with the second tube 33,33A.

4. Reduce the Volume of the Electric Parking Brake Actuator:

Because the structure of the actuator assembly 13 does not have to be enlarged to fit the extra balancer and the cable-tension measuring device 50,50A is compact, the volume of the electric parking brake actuator is smaller than that of a conventional electric parking brake actuator having a cable-tension measuring device.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electric parking brake actuator comprising:
    an actuator device;
    a brake device connected with the actuator device and having
        a cable mounted through the actuator device; and
        a tube assembly mounted around the cable, located outside the actuator device, mounted securely on the actuator device and having
            a first tube; and
            a second tube composed of two separate segments including
                a first segment having two ends; and
                a second segment having two ends; and
    a cable-tension measuring device connected with the tube assembly and having
        a tubular first member mounted around the cable, wherein the two ends of the first segment of the second tube respectively mounted securely on the actuator device and the first member, the first member having
            an end surface;
            an outer surface;
            a through hole axially formed through the first member and having
                a wide section having a diameter and securely inserted into by a corresponding end of the first segment; and
                a narrow section having a diameter smaller than that of the wide section; and
            a round rim radially protruding from the outer surface of the first member and aligning with the end surface of the first member;
            a holding section being elongated along a line parallel to an axis of the first member, having an arcuated cross section and radially protruding from the rim; and
            a magnet recess formed in the holding section and having an opening;
        a second member mounted around the cable, facing the first member and capable of moving toward the first member relatively, wherein one of the ends of the second segment securely mounted on the second member and the other one of the ends of the second segment being fixed, the second member having
            a tubular tube bracket having
                an outer surface;
                two ends;
                a tube recess axially formed in one of the ends of the tube bracket, mounted securely around a corresponding end of the second segment and having a diameter and a bottom;
                a spring recess axially formed in the other one of the ends of the tube bracket, mounted around the rim and having a bottom and a diameter;
                a bracket hole axially formed through the bottoms of the spring recess and the tube recess and having a diameter smaller than that of the tube recess and that of the spring recess; and
            a hollow hoop mounted around the first member beside the rim and the end of the tube bracket which is adjacent to the spring recess; and
            an IC seat mounted securely on the outer surface of the tube bracket;
        a compressible spring mounted between the first member and the second member, facing the opening of the magnet recess, mounted in the spring recess, adjacent to the narrow section and having two ends respectively abutting the bottom of the spring recess and the end surface of the first member;
        a Hall IC mounted securely on the IC seat; and
        a magnet mounted securely in the magnet recess.

2. The electric parking brake actuator as claimed in claim 1, wherein the hoop has an end adjacent to the first member and the second member further has a pleated tube mounted around the first member and the end of the hoop.

3. The electric parking brake actuator as claimed in claim 2, wherein the tube bracket has two opposite sides and two protrusions which are formed on the outer surface of the tube bracket beside the IC seat, respectively located at the opposite sides of the tube bracket and covered by the hoop.

4. The electric parking brake actuator as claimed in claim 1, wherein
    the first tube has an end; and
    the actuator device has
        a housing;
        an actuator assembly mounted in the housing and having a driving end;
        a guiding tube mounted securely on and protruding out from the housing; and
        a sleeve driven by the driving end of the actuator assembly, mounted slidably in the guiding tube and mounted securely around the end of the first tube and the driving end of the actuator assembly.

5. The electric parking brake actuator as claimed in claim 3, wherein
    the first tube has an end; and the actuator device has
- a housing;
- an actuator assembly mounted in the housing and having a driving end;
- a guiding tube mounted securely on and protruding out from the housing; and
- a sleeve driven by the driving end of the actuator assembly, mounted slidably in the guiding tube and mounted securely around the end of the first tube and the driving end of the actuator assembly.

* * * * *